United States Patent [19]

Goodman

[11] 4,383,140
[45] May 10, 1983

[54] TELEPHONE RECEIVER HOLDING DEVICE

[76] Inventor: Harold Goodman, 590 Ocean Ave., Apt. 11, Long Branch, N.J. 07740

[21] Appl. No.: 218,652

[22] Filed: Dec. 22, 1980

[51] Int. Cl.³ .............................................. H04M 1/12
[52] U.S. Cl. ..................................................... 179/149
[58] Field of Search .................... 179/149, 148 R, 150, 179/151, 152, 153

[56] References Cited

U.S. PATENT DOCUMENTS

| | | | |
|---|---|---|---|
| 1,847,649 | 3/1932 | Hazard | 179/148 R |
| 2,310,032 | 2/1943 | Mathieson | 179/149 |
| 2,473,106 | 6/1949 | Mathieson | 179/148 R |
| 2,766,330 | 10/1950 | Olsen | 179/150 |
| 2,770,682 | 11/1956 | Malone | 179/150 |
| 2,835,745 | 4/1958 | Romano | 179/149 |
| 3,172,964 | 3/1965 | Bulmer | 179/150 |
| 4,049,927 | 9/1977 | Sutton | 179/150 |

FOREIGN PATENT DOCUMENTS

| | | | |
|---|---|---|---|
| 1008779 | 5/1957 | Fed. Rep. of Germany | 179/148 R |
| 998649 | 10/1954 | France | 179/149 |
| 2224948 | 10/1974 | France | 179/148 R |
| 602949 | 3/1960 | Italy | 179/150 |
| 80298 | 3/1947 | Switzerland | 179/148 R |

OTHER PUBLICATIONS

"Now . . . Holdaphone", Advertisement, *NY Times*, Mar. 5, 1950.

*Primary Examiner*—G. Z. Rubinson
*Assistant Examiner*—L. C. Schroeder
*Attorney, Agent, or Firm*—Charles I. Brodsky

[57] ABSTRACT

A holding device is described that incorporates a structure which clamps onto a telephone desk phone and supports the receiver on an adjustable arm. A manually operated switch is provided, which permits opening and closing of the telephone circuit with a minimum of effort. A cross member is incorporated, designed to fit around the rear ears of the telephone cradle base, in assuring a firm fastening for the holding device. An arrangement of securing the holding device to the underside of the telephone base permits a secure clamping to be effected, without any necessity of impairing the structural integrity of the desk phone.

7 Claims, 4 Drawing Figures

TELEPHONE RECEIVER HOLDING DEVICE

FIELD OF THE INVENTION

This invention relates to a telephone holding device and, more particularly, to such an arrangement adaptable to clamping onto a standard desk telephone without impairing its structural integrity.

BACKGROUND OF THE INVENTION

As is well known and understood, the usual type of telephone holding device presently available is one that rests on the shoulder of the user, and held there by pressure applied by one side of the user's head. Because such holding device is secured to the receiver of the telephone, its operation requires lifting of the receiver from its base, placing it on the shoulder, and attempting to hold it in place through a gently applied pressure from the head. However, as will be readily apparent to anyone who has used such a device, one of its major disadvantages is that the use in the intended fashion prevents a complete freedom of arm movement, because one shoulder is required to constantly apply the pressure so as to prevent the receiver from slipping-off the user's shoulder. Although such application of pressure might not be overly burdensome for most people, continued operation becomes somewhat tiresome for the elderly, and very difficult for other users suffering from physical handicaps that prevent the required holding pressure needed.

SUMMARY OF THE INVENTION

As will become clear hereinafter, the telephone receiver holding device of the present invention provides an inexpensively manufactured arrangement which offers far more convenience than those devices available in the prior art, and facilitates a "hand-free" usage. The arrangement includes a main frame member which is secured to the underside of the telephone base, by means of a bolt construction, and to the upper end of the telephone by means of a cross-member which fits around the rear ears of the telephone receiver cradle. A telescoping arm is coupled with the main frame member, to the end of which the receiver is held in adjustable orientation, both in vertical and horizontal planes, for compatible placement in accordance with the requirements and positioning of the user's head. As will be seen, because the receiver is permanentaly thus held away from the telephone cradle, a manually coupled switch is provided, in the form of a bar which is hinged to the main frame. With the hinge in a lowered position, the bar will be seen to depress the pins in the telephone cradle, in breaking the audio circuit. With the hinge raised, however, the bar frees the pins, thereby opening the circuit and completing the audio connection. To facilitate the "hand-free" operation, this circuit "bar switch" is fabricated from a metallic composition, so as to be held in place by a magnetic means, also affixed to the main frame construction. Actuating the audio circuit for use then follows a simple lifting of the metal bar from the cradle pins, while a simple depressing of the bar serves to terminate the telephone conversation. Because the receiver is always held in place, away from the phone, there exists no need to lift the receiver when a call connection is desired, nor is there need to replace it after the conversation has been completed. In order to facilitate the use of the telephone holding device of the invention, a type of "handle" is affixed at the front of the telephone, and to its underside, to assist in moving the telephone base and the receiver held, into position for use. As will be appreciated from a reading of the following description, the telephone receiver holding device of the invention can be provided as a separate adjunct, for use with a standard desk phone in an installation that requires nothing beyond one or two screws, and without any need for drilling into the telephone base itself. By proper selection of the dimensions for the component parts of the holding device, a fabrication can be had suitable for most every desk phone in use today, independent of its height, width, length, or other dimensionings.

BRIEF DESCRIPTION OF THE DRAWING

These and other features of the present invention will be more clearly understood from a consideration of the following description, taken in connection with the accompanying drawing in which.

DETAILED DESCRIPTION OF THE DRAWING

Figures 1, 2:
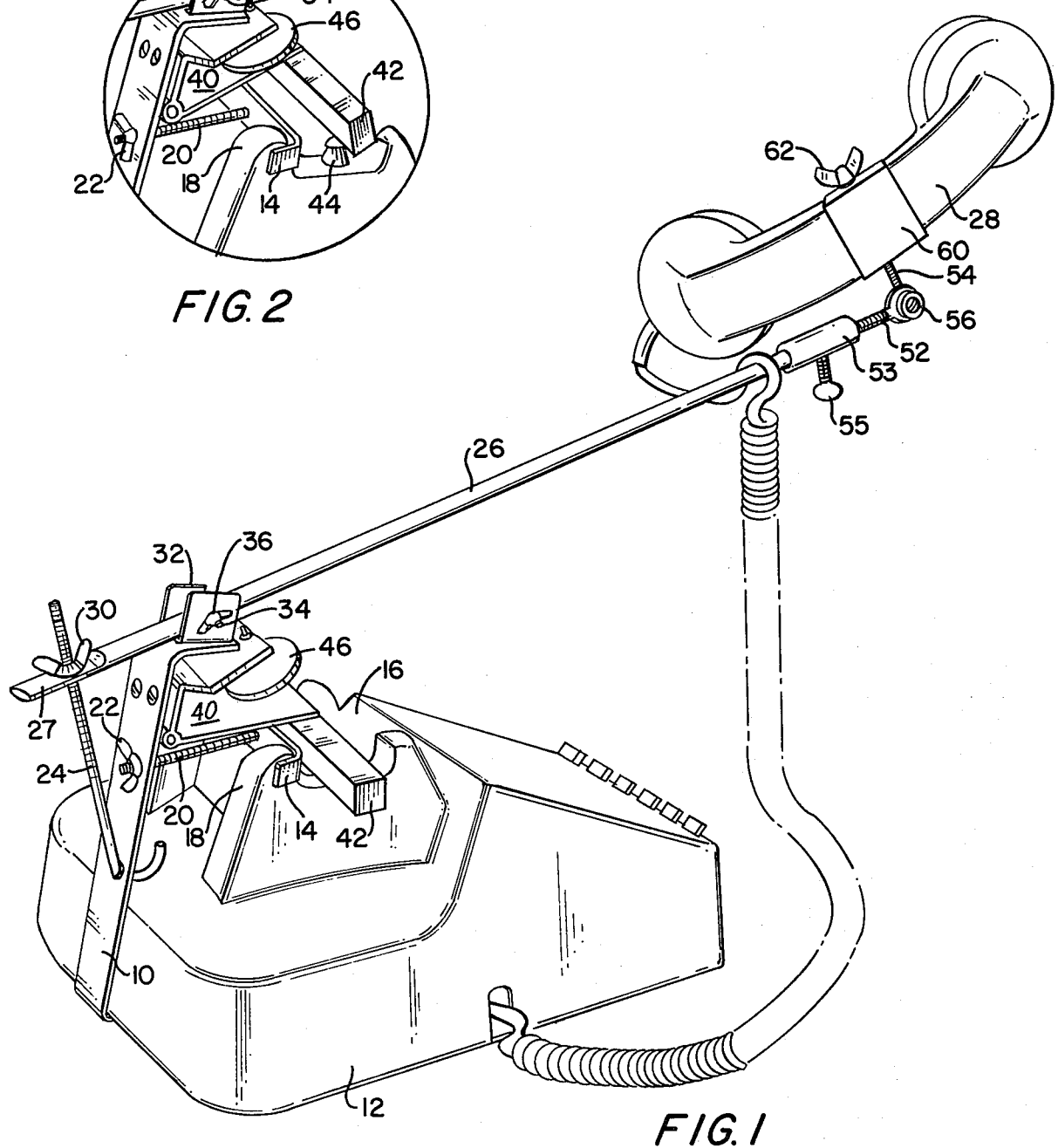
FIG. 1 is a perspective view of the telephone receiver holding device of the invention, as it would attach to a standard desk telephone, and as it would appear when the telephone is not in use.
FIG. 2 is an exploded view of the manual switching feature of the invention, as it would appear during the time a conversation is taking place.

Referring to the drawing, the main support member of the holding device is shown at 10, and is fabricated with an angle on its bottom end to tuck under the base of the telephone 12. Although not illustrated, it will be understood that such bottom end has, in conformity with present day telephone construction, a pair of holes in it, which line up with the holes at the rear of the underneath housing plate of the telephone base, adjacent to its "loudness" control. A simple screw-driver can be employed in making the connection, which, in one embodiment of the invention, required a pair of two metal screws.

Also shown, as a means of providing the clamping needed to secure the holding device to the telephone is a cross-member 14, which spans the rear of the telephone cradle 16, and bears against, and around, the rear ears of the cradle, as at 18. As illustrated, a threaded bolt 20 extends through the center portion of the cross-member 14, through a hole in the support frame 10, to be tightened thereat by means of a wing nut 22, which is rotated to provide sufficient force so as to combine with the screw-tightening at the underside of the telephone base, in clamping the holding device of the invention firmly in place.

A hooked rod 24 is provided, passing through a slot in the main frame member 10, in serving as an adjustable anchor for an arm 26 which holds the telephone receiver 28. As indicated, the rear portion 27 of the arm 26 is flattened, and has a hole therein to receive the threaded portion of the hooked rod 24, where it is then held in place, by means of a second wing nut 30. A "U" shaped bracket 32 is incorporated, attached at the top angle of the main support member 10, having a hole on either side of the "U" section. This bracket serves as a support for a bolt 34 that passes through one hole of the "U" portion, then through the arm 26, the other hole of the "U" segment, then to be secured thereat by a third wing nut 36. As will be apparent, this combination permits the bolt 34 to act as a pivot for the arm 26, such that the arm 26 can be moved upwards or downwards under control of the rotation of the wing nut 30. In one specific embodiment of the invention, the arrangement was such that a loosening of the wing nut 30 would result in a lowering of the arm 26 and the held receiver 28.

Also shown in the drawing is a hinge 40 which is welded to the inner surface of the main support member 10. As shown, the bottom leaf of the hinge is secured to a bar 42 that, when in the "down" position (FIG. 1), depresses the two projecting pins 44 of the telephone cradle 16. The top leaf of the hinge 40, on the other hand, is attached to a magnetic disk 46, which serves to hold the bar 42 when it is lifted so as to free the pins 44 (FIG. 2). As will be apparent, when fingertip pressure is applied to lower the bar 42—made, for example, of steel, to facilitate the magnetic holding—the cradle pins 44 are depressed in closing the audio circuit. But when the fingertip pressure is employed to raise the steel bar 42, the magnetic disk 46 holds it away from the pins, so as to open the audio circuit and permit the telephone communication to proceed. Employing a hinge 40 of the type described, with its associated magnetic disk 46, will thus be seen to permit the telephone connection to be easily and simply made.

Figure 3:
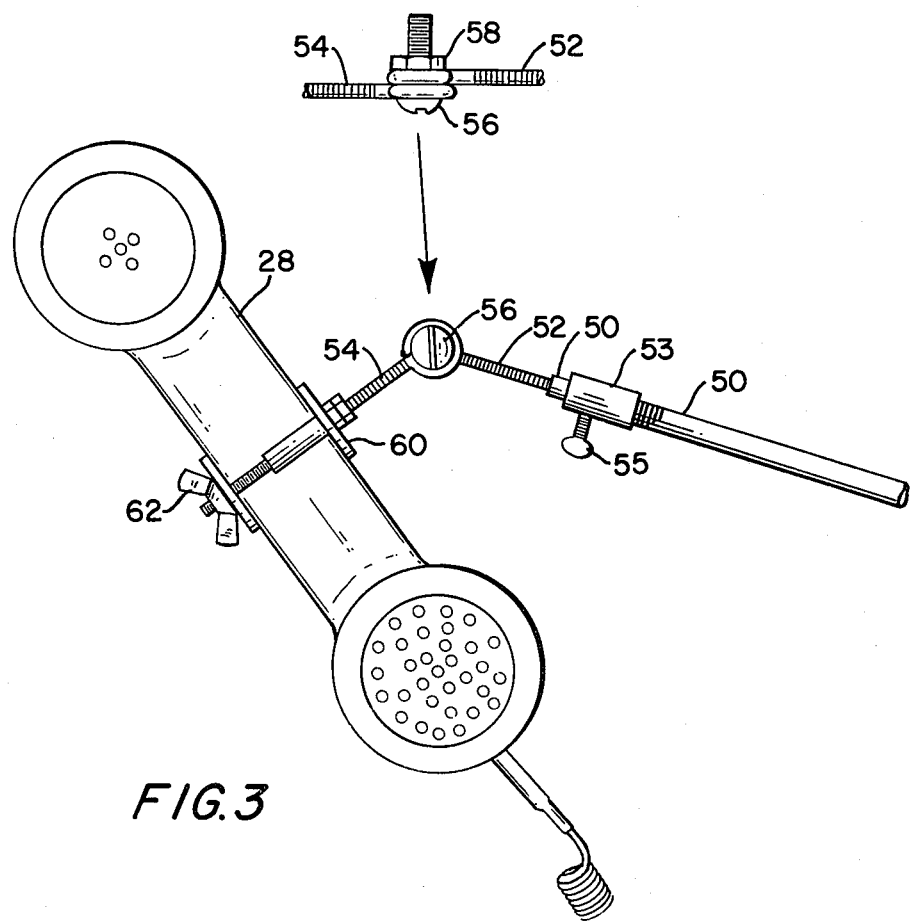
FIG. 3 is an exploded view of that part of the construction of the invention which permits adjustment of the telephone receiver in both vertical and horizontal planes.

Referring, now, to the receiver end of the arm 26, it will first be understood that traversing the arm, and included within it, is a rod 50 arranged to telescope into the arm, and when extended, permits a greater degree of overall length. To effectuate this, the receiver end of the rod 50 is threaded, to receive a similarly threaded collar 53 having a thumb screw 54 which extends inwardly of the collar 53 in locking the rod 50 in any given position. As more clearly shown in FIG. 3, the remote end of the rod 50 terminates in an eye bolt 52 which fastens to a second similar bolt 54 by means of a threaded bolt 56 and threaded nut 58. The eye bolt 54 will be seen to traverse oppositely aligned holes in a second "U" shaped bracket 60, to be tightened by a wing nut 62 so as to firmly hold the receiver 28 in position. With such configuration, once the threaded bolt 56 and threaded nut 58 are tightened, the receiver 28 can be easily oriented in vertical and horizontal position through the resultant permissible turning on the eye bolts 52 and 54, which then permit a wide degree of positioning in acting as an axle. Because the eye bolts 52 and 54 are thus enabled to swivel on the threaded bolt 56, an enormous versatility for positioning the receiver results, so as to provide a maximum degree of adjustment.

Figure 4:
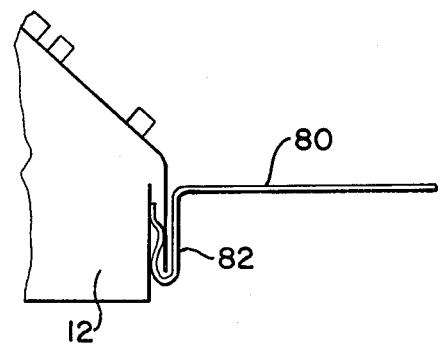
FIG. 4 illustrates a perspective view of an arrangement to clamp to the underside of the telephone base in serving as a handle for moving the telephone about.

With the bar 42 then depressed downwardly—so as to depress the pins 44 of the telephone cradle 16 when no call is being made—, all that is necessary to initiate the call is to lift the bar 42 momentarily, for it to be attracted and held by the magnetic disk 46, and the telephone then adjusted along the desk to bring it into position adjacent the user's head. As will be apparent, once the wing nuts 30 and 62 have been adjusted, and once the thumb screw 54 has been set for the proper length, and thereafter remain as so adjusted, all that is necessary is to grasp the telephone at its base to move it into proper positioning. In order to assist such movement—because not all hands have a span adequate to the task, or a strength necessary to effect the movement—, a handle arrangement "80" (FIG. 4) is included, having a spring-like clamp 62, in a proper dimension to connect to the underside of a telephone base, at its front—for example, on either side of the housing which encloses the electrical and mechanical parts of the desk telephone 12. By fabricating the clamp 62 of a tempered steel, as in one embodiment of the invention, only a mere grasping of the clamp 62 is required to exert the force needed to swing the telephone arrangement so as to bring the held receiver into proximate position adjacent the user's head.

With the arrangement of the invention as thus far described, it will be seen that a complete "hands-off" operation can result, with the receiver being held firmly, yet at the same time freeing the user's hands for any other work that he might wish to do at the time. It will also be apparent that such an arrangement requires only a limited degree of strength, and can thus be easily suitable for use by an elderly person, or by one whose use of hands is restricted. Particularly attractive is the ability to incorporate the device of the invention in conjunction with existing desk telephones, as no need exists to drill through the present telephone housing in order to secure the main frame in place—with the present invention, all that is necessary is to tighten the wing nut 22 which secures the cross-member 14, and to fasten the holding screws at the underside of the telephone case. As will be readily apparent to one skilled in the art, predetermined dimensioning of the component parts of the telephone receiver holding device will make the arrangement useful for all types of desk phones, even though variations presently exist amongst the millions of telephones now in use today. And equally attractive will be seen to be the specific eyebolt configuration employed which permits the adjustment of the receiver to meet the required needs of the user, independently of whether he desires the receiver to point either at the left side of his head or at the right side.

While there has been described what are considered to be a preferred embodiment of the present invention, it will be readily apparent that modifications can be made by those skilled in the art without departing from the scope of the teachings herein of providing a telephone receiver holding device which can clamp onto an existing desk telephone without impairing the structural integrity of such a unit. As such, the manufacture can be made economical and the installation very simple, requiring only a screw driver in order to complete the desired construction. Although other arrangements of securing the support member might incorporate an extension of its bottom end so as to transverse the entire underside of the telephone base only to secure at the front of the receiver, instead of using the screw-holding arrangements described, it will be noted that the latter construction is to be preferred because of its simplicity of manufacture and consequent lessening of costs. And, it will also be seen that rotation of the receiver could be accomplished merely by loosening the thumb screw described and then rotating the telescoping arm. Because such modifications could be made—and because such are considered to be within the scope of the teachings of this invention—resort should be had to the claims affixed hereto for a true understanding of the breadth of the disclosure therein.

I claim:

1. A holding device for the receiver of a telephone, comprising:

a support frame adapted for securement at the rear of said telephone and to be held fixedly in place thereby;

first means adapted for rotatable coupling to said receiver and pivotably secured to said support frame, to permit adjustable orientation of said receiver in horizontal and/or vertical plane, in accordance with the desires of the telephone user, and wherein said first means is arranged and configured to maintain said receiver in fixed position, separately and distant from the cradle portion of said telephone;

and switch means also secured to said support frame for mechanically enabling and disabling the telephone audio circuits within said receiver, independent of the specific receiver orientation or positioning maintained;

and wherein said support frame includes a cross member extending inwardly therefrom to secure to said telephone at the rear of the cradle portion thereof.

2. The holding device of claim 1 wherein said switch means includes closure means hingedly secured to said support frame, and adapted for alignment within the cradle portion of said telephone to depress the audio circuit control pins thereof when in a first hinge position, and to release said control pins when in a second hinge position.

3. The holding device of claim 2 wherein said switch means also includes means for magnetically holding said closure means away from said audio circuit control pins when said closure means is moved to said second hinge position.

4. The holding device of claim 1 wherein said support frame is further secured to said telephone at the underside thereof, and in a manner to effect an overall securement without impairing the structural integrity of any housing enclosing said telephone.

5. The holding device of claim 1 wherein there is also included handle means extending outwardly from the front of said telephone to assist in the moving thereof from place to place about a surface upon which said telephone may be resting when in use.

6. The holding device of clailm 1 wherein said first means includes mechanical coupling means operative to permit adjustment of said receiver in both horizontal and vertical planes, and to permit adjustment of the height of said receiver, in accordance with user preference, above a surface upon which said telephone may be resting when in use.

7. The holding device of claim 6 wherein said first means also includes an elongation member arranged in telescoping alignment to adjust the length at which said receiver is maintained distant from the cradle portion of said telephone.

* * * * *